US011954294B2

(12) United States Patent
Hu (10) Patent No.: US 11,954,294 B2
(45) Date of Patent: Apr. 9, 2024

(54) TOUCH SUBSTRATE AND MANUFACTURING METHOD THEREFOR, AND TOUCH DISPLAY DEVICE AND CONTROL METHOD THEREFOR (71) Applicants: Chengdu BOE Optoelectronics Technology Co., Ltd., Sichuan (CN); BOE Technology Group Co., Ltd., Beijing (CN)

(72) Inventor: Yao Hu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,344

(22) PCT Filed: Aug. 4, 2021

(86) PCT No.: PCT/CN2021/110545
§ 371 (c)(1),
(2) Date: Oct. 25, 2022

(87) PCT Pub. No.: WO2022/062690
PCT Pub. Date: Mar. 31, 2022

(65) Prior Publication Data
US 2023/0176701 A1 Jun. 8, 2023

(30) Foreign Application Priority Data
Sep. 28, 2020 (CN) .......................... 202011042949.X (51) Int. Cl.
*G06F 3/044* (2006.01)
(52) U.S. Cl.
CPC .......... *G06F 3/0446* (2019.05); *G06F 3/0443* (2019.05)

(58) Field of Classification Search
CPC .. G06F 3/0446; G06F 3/0443; G06F 3/04164; G06F 2203/04102; G06F 2203/04103; G06F 2203/04111
See application file for complete search history.

(56) References Cited

U.S. PATENT DOCUMENTS

| 2018/0069053 A1 | 3/2018 | Bok |
| 2018/0157361 A1 | 6/2018 | Kim |

(Continued)

FOREIGN PATENT DOCUMENTS

| CN | 106557203 A | 4/2017 |
| CN | 107808893 A | 3/2018 |

(Continued)

OTHER PUBLICATIONS

International Search Report for PCT/CN2021/110545 dated Nov. 3, 2021.

*Primary Examiner* — Deeprose Subedi
(74) *Attorney, Agent, or Firm* — Ling Wu; Stephen Yang; Ling and Yang Intellectual Property (57) ABSTRACT A touch substrate and a manufacturing method therefor, and a touch display device and a control method therefor. The touch substrate comprises a base substrate and a touch electrode structure. The touch substrate comprises a bendable region, and a first non-bendable region and a second non-bendable region adjacent to the bendable region. The touch electrode structure comprises a first touch electrode structure located in the first non-bendable region, and a second touch electrode structure located in the second non-bendable region. The first touch electrode structure comprises a plurality of first transmitter electrode groups and a plurality of first receiver electrode groups. The second touch electrode structure comprises a plurality of second transmitter electrode groups and a plurality of second (Continued)

receiver electrode groups. The bendable region comprises at least a first receiver electrode and a second receiver electrode.

15 Claims, 5 Drawing Sheets

(56) References Cited

U.S. PATENT DOCUMENTS

| | | |
|---|---|---|
| 2018/0181224 A1 | 6/2018 | Li et al. |
| 2019/0377443 A1 | 12/2019 | Dong et al. |
| 2020/0097128 A1 | 3/2020 | Jung et al. |
| 2020/0363928 A1* | 11/2020 | Lin .................... G06F 3/0445 |

FOREIGN PATENT DOCUMENTS

| | | |
|---|---|---|
| CN | 108153376 A | 6/2018 |
| CN | 108334215 A | 7/2018 |
| CN | 110221653 A | 9/2019 |
| CN | 112181201 A | 1/2021 |
| CN | 212873451 U | 4/2021 |

* cited by examiner

TOUCH SUBSTRATE AND MANUFACTURING METHOD THEREFOR, AND TOUCH DISPLAY DEVICE AND CONTROL METHOD THEREFOR

CROSS-REFERENCE TO RELATED APPLICATIONS

The present application is a U.S. National Phase Entry of International Application No. PCT/CN2021/110545 having an international filing date of Aug. 4, 2021, which is based on and claims the priority to the Chinese Patent Application No. 202011042949.X, filed on Sep. 28, 2020. The above-identified applications are incorporated herein by reference in their entireties.

TECHNICAL FIELD

The present application relates to the field of display technologies, and particularly relates to a touch substrate and a manufacturing method therefor, and a touch display apparatus and a control method therefor.

BACKGROUND

With upgrading of display devices, people pay more and more attention to folding display screens. According to usage scenarios, a folding display screen may be an outer folding screen or an inner folding screen, wherein the outer folding screen means that a folding display screen is on an outer side, for example, it may be used as a tablet computer or a notebook computer before folding, and may be used as a mobile phone after folding. The folding display screen usually includes a touch module, and a user may control the display screen by touching the display screen.

However, at present, the outer folding screen still needs to be improved.

SUMMARY

The present application is conducted based on the inventor's discovery and understanding of following facts and problems.

The inventor found that at preset, an outer folding screen has problems of poor grounding signals of a whole machine and false touch, which affects user experience. Specifically, when the outer folding screen is in a bent state (that is, during split-screen display), in an application scenario, a user will hold the screen with one hand. In this application scenario, since the screen of the outer folding screen is relatively large, usually, the user's fingers are all placed on the display screen (referring to FIG. 5, the user's touch finger 31 touches a first display region 310 for touch display, and the other part 32 of the user's hand is placed on a second display region 320), at this time, since the fingers can't touch a middle frame and the human body is grounded, there are two grounding signals in the outer folding screen, which leads to a problem that grounding signals of the whole machine are poor. When the user's touch finger 31 touches the first display region 310, there will be a phenomenon of not reporting a point, thus affecting a touch effect and user experience.

Figure 5:
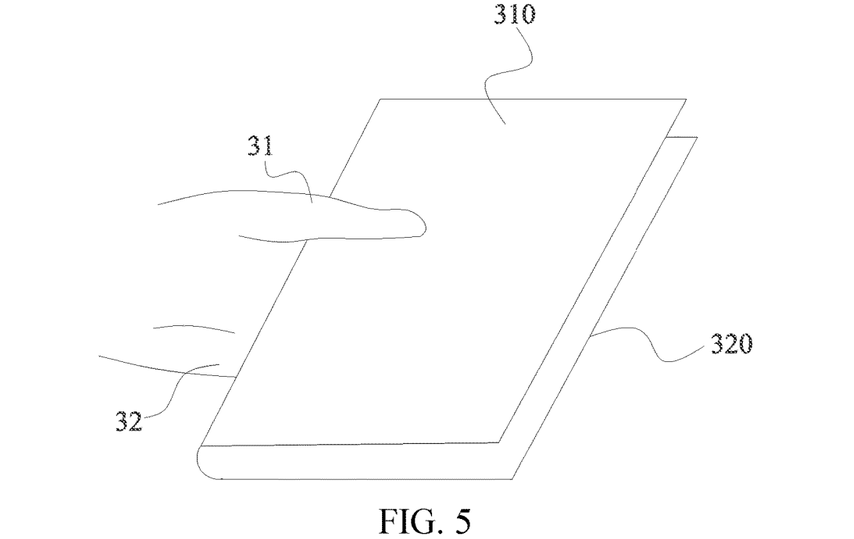
FIG. 5 shows a schematic diagram of holding an outer folding screen with one hand.
Figure 6:
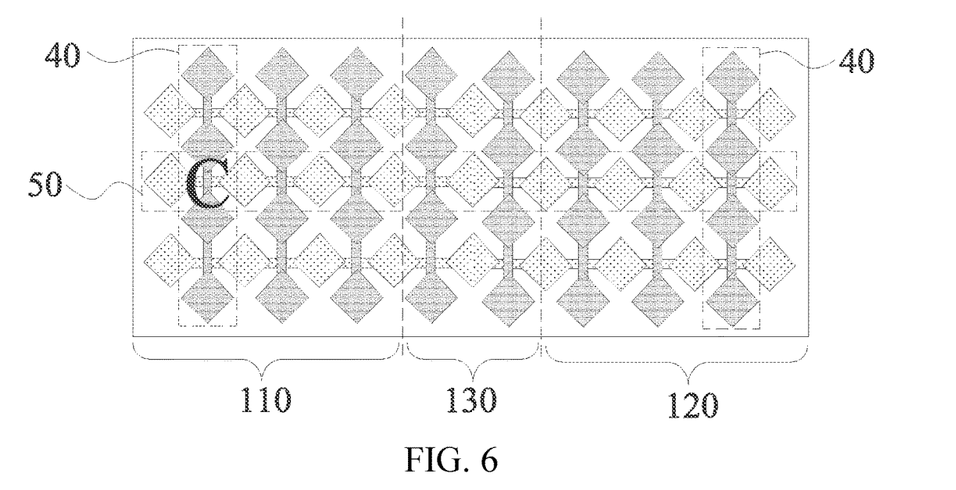
FIG. 6 shows a schematic diagram of a structure of a traditional touch substrate.

In addition, the outer folding screen is provided with a touch substrate. Referring to FIG. 6, a touch substrate has a bent region 130 and a first non-bent region 110 and a second non-bent region 120 adjacent to the bent region 130. When an outer folding screen which is in a bent state currently is in use, an emission electrode group 40 in the second non-bent region 120 is in an OFF state, an emission electrode group 40 in the first non-bent region 110 is in an ON state, and a receiving electrode group 50 on the touch substrate extends from the first non-bent region 110 to the second non-bent region 120 via the bent region 130. Referring to FIG. 5, when the touch finger 31 touches a first non-bent region (such as the first display region 310 shown in the figure), the other part 32 of the user's hand will interfere with touch, which will lead to discrepancy between a reported point position and a touch position, resulting in a problem of false touch and affecting user experience. Specifically, referring to FIG. 6, when the user's touch finger touches a C point position in the first non-bent region 110, an emission electrode group 40 corresponding to the C point position emits a signal, the receiving electrode group 50 receives the signal and reports the point, when the other part of the hand touches a portion of the receiving electrode group 50 extending into the second non-bent region 120, a sensing amount of the receiving electrode group 50 will be enhanced, so that a sensed touch position (i.e., a reported point position) will be offset compared with an actual touch position, resulting in discrepancy between the reported point position and the actual touch position, resulting in a problem of false touch and affecting use. Moreover, the above interference is not easy to be intercepted as a background noise, so it cannot be solved through an algorithm.

The present application aims at alleviating or solving at least one of the above mentioned problems at least to some extent.

In one aspect of the present application, the present application provides a touch substrate. The touch substrate includes a base substrate, and a touch electrode structure located on the base substrate, the touch substrate includes a bent region, and a first non-bent region and a second non-bent region adjacent to the bent region, and the first non-bent region and the second non-bent region are configured to be bent around the bent region; the touch electrode structure includes a first touch electrode structure located in the first non-bent region and a second touch electrode structure located in the second non-bent region, the first touch electrode structure includes multiple first emission electrode groups and multiple first receiving electrode groups, the second touch electrode structure includes multiple second emission electrode groups and multiple second receiving electrode groups, the first emission electrode groups and the second emission electrode groups all extend along a first direction, the first receiving electrode groups and the second electrode groups all extend along a second direction, the first direction intersects with the second direction, a first receiving electrode group includes multiple first receiving electrodes arranged along the first direction, a second receiving electrode group includes multiple second receiving electrodes arranged along the first direction, and the bent region includes at least a first receiving electrode and a second receiving electrode. Therefore, the touch substrate may effectively alleviate problems of poor grounding of a whole machine and false touch during split-screen display of a display apparatus, improve a touch display effect and enhance user experience.

Further, the first receiving electrodes and the second receiving electrodes are in a same layer and made of a same material, a first emission electrode group includes multiple first emission electrodes, a second emission electrode group includes multiple second emission electrodes, and the first emission electrodes and the second emission electrodes are in a same layer and made of a same material, so that the touch electrode structure has good use performance and is convenient for manufacturing an electrode group.

Further, an orthographic projection of a first receiving electrode located in the bent region on the base substrate and an orthographic projection of a second receiving electrode located in the bent region on the base substrate are arranged at intervals. Therefore, the touch electrode structure may be further improved and has good use performance.

Further, the bent region has multiple first receiving electrodes and multiple second receiving electrodes, the multiple first receiving electrodes and the multiple second receiving electrodes are all arranged along the second direction, and two second receiving electrodes and a first receiving electrode located between the two second receiving electrodes are arranged in a triangle. Therefore, the touch electrode structure may be further improved and has good use performance.

Further, the first receiving electrodes and the second receiving electrodes located in the bent region are all diamond-shaped electrode blocks, a first receiving electrode has a first side, a second receiving electrode has a second side, the first side and the second side are parallel and adjacent, and a distance between the first side and the second side that are adjacent is less than $\sqrt{2}/2$ times a diagonal length of a diamond-shaped electrode block along the first direction. Therefore, a problem that linearity of the display apparatus becomes worse when the display apparatus is flattened for display due to an unreasonable setting for a space between a first receiving electrode and a second receiving electrode may be avoided.

Further, the bent region has multiple first receiving electrodes and multiple second receiving electrodes, the multiple first receiving electrodes and the multiple second receiving electrodes are all arranged along the first direction, and there is a gap between a first receiving electrode and a second receiving electrode that are adjacent. Therefore, the touch electrode structure may be further improved and has good use performance.

Further, the first receiving electrodes and the second receiving electrodes located in the bent region are all triangular electrode blocks, first receiving electrodes and second receiving electrodes in a non-bent region are all diamond-shaped electrode blocks, and a length of the gap between the first receiving electrode and the second receiving electrode located in the bent region is less than ½ of a diagonal length of a diamond-shaped electrode block located in the non-bent region along the first direction. Therefore, the touch electrode structure may be further improved and has good use performance.

In another aspect of the present application, the present application provides a method for manufacturing a touch substrate. The method includes: providing a base substrate, wherein the touch substrate includes a bent region, and a first non-bent region and a second non-bent region adjacent to the bent region, and the first non-bent region and the second non-bent region are configured to be bent around the bent region; forming a touch electrode structure on the base substrate, including a first touch electrode structure located in the first non-bent region and a second touch electrode structure located in the second non-bent region, wherein the first touch electrode structure includes multiple first emission electrode groups and multiple first receiving electrode groups, the second touch electrode structure includes multiple second emission electrode groups and multiple second receiving electrode groups, the first emission electrode groups and the second emission electrode groups all extend along a first direction, the first receiving electrode groups and the second receiving electrode groups all extend along a second direction, the first direction intersects with the second direction, a first receiving electrode group includes multiple first receiving electrodes arranged along the first direction, a second receiving electrode group includes multiple second receiving electrodes arranged along the first direction, and the bent region includes at least a first receiving electrode and a second receiving electrode. Therefore, the touch substrate having the aforementioned touch structure may be easily obtained.

In another aspect of the present application, the present application provides a touch display apparatus. The touch display apparatus includes the touch substrate described above. Therefore, the touch display apparatus has all features and advantages of the touch substrate described above, and will not be repeated here. Generally speaking, the touch display apparatus has good touch display effect, which may significantly improve user experience.

Further, a touch chip is further included, wherein a first receiving electrode and a second receiving electrode in a first touch electrode structure located in a first non-bent region are connected to a same touch chip, or, a main touch chip and a secondary touch chip are further included, wherein the main touch chip is electrically connected with the secondary touch chip, a first emission electrode group, a second emission electrode group, and a first receiving electrode group are electrically connected with the main touch chip, and a second receiving electrode group is electrically connected with the secondary touch chip.

In another aspect of the present application, the present application provides a method for controlling the touch display apparatus described above. The method includes: making touch electrode structures located in a first non-bent region and a second non-bent region be in an ON state during split-screen display of the touch display apparatus; making a second touch electrode structure located in the second non-bent region be in an OFF state during split-screen display of the touch display apparatus, or, during split-screen display of the touch display apparatus, making a second emission electrode group in the second touch electrode structure in the second non-bent region be in an OFF state, making a second receiving electrode group be in an ON state, and applying a grounding signal to the second receiving electrode group. Therefore, a problem of poor grounding of a whole display apparatus may be effectively alleviated.

BRIEF DESCRIPTION OF DRAWINGS

The above mentioned and/or additional aspects and advantages of the present application will become apparent and easy to understand from following description of embodiments in conjunction with accompanying drawings.

Reference signs are described as follows.

100: base substrate; 110: first non-bent region; 120: second non-bent region; 130: bent region; 140: display region; 150: peripheral routing region; 200: first touch electrode structure; 400: second touch electrode structure; 210: first emission electrode group; 230: second emission electrode group; 40: emission electrode group; 221: first receiving electrode group; 222: second receiving electrode group; 223: gap; 11: first receiving electrode; 12: second receiving electrode; 1: first side; 2: second side; 310: first display region; 320: second display region; 31: touch finger; 32: other part of hand; 50: receiving electrode group; 300: insulation layer; 500: conductive connection layer; 600: touch chip; 610: secondary touch chip; 1000: touch substrate; 2000: display panel.

DETAILED DESCRIPTION

Embodiments of the present application will be described in detail below, examples of the embodiments are shown in the accompanying drawings, wherein same or similar reference numerals refer to same or similar elements or elements with same or similar functions throughout. Embodiments described herein with reference to the accompanying drawings are exemplary, used for explaining the present application only, but should not be construed to limit the present application.

In one aspect of the present application, the present application provides a touch substrate. According to an embodiment of the present application, referring to FIG. 1, the touch substrate includes a base substrate 100 and a touch electrode structure, wherein the base substrate 100 has a bent region 130 and a first non-bent region 110 and a second non-bent region 120 adjacent to the bent region 130, and the touch electrode structure includes a first touch electrode structure 200 located in the first non-bent region 110 and a second touch electrode structure 400 located in the second non-bent region 120. The first touch electrode structure 200 has multiple first emission electrode groups 210 and multiple first receiving electrode groups 221, the second touch electrode structure 400 includes multiple second emission electrode groups 230 and multiple second receiving electrode groups 222, the first emission electrode groups 210 and the second emission electrode groups 230 each extend along a first direction, the first receiving electrode groups 221 and the second receiving electrode groups 222 each extend along a second direction, and the first direction intersects with the second direction. A first receiving electrode group includes multiple first receiving electrodes 11 arranged along the first direction, a second receiving electrode group includes multiple second receiving electrodes 12 arranged along the first direction, and a bent region includes at least a first receiving electrode and a second receiving electrode. That is, a first emission electrode group in the first non-bent region 110 and a second emission electrode group in the second non-bent region 120 are not connected. Therefore, the touch substrate may effectively alleviate problems of poor grounding of a whole machine and false touch during split-screen display of a display apparatus, improve a touch display effect and enhance user experience.

Figure 1:
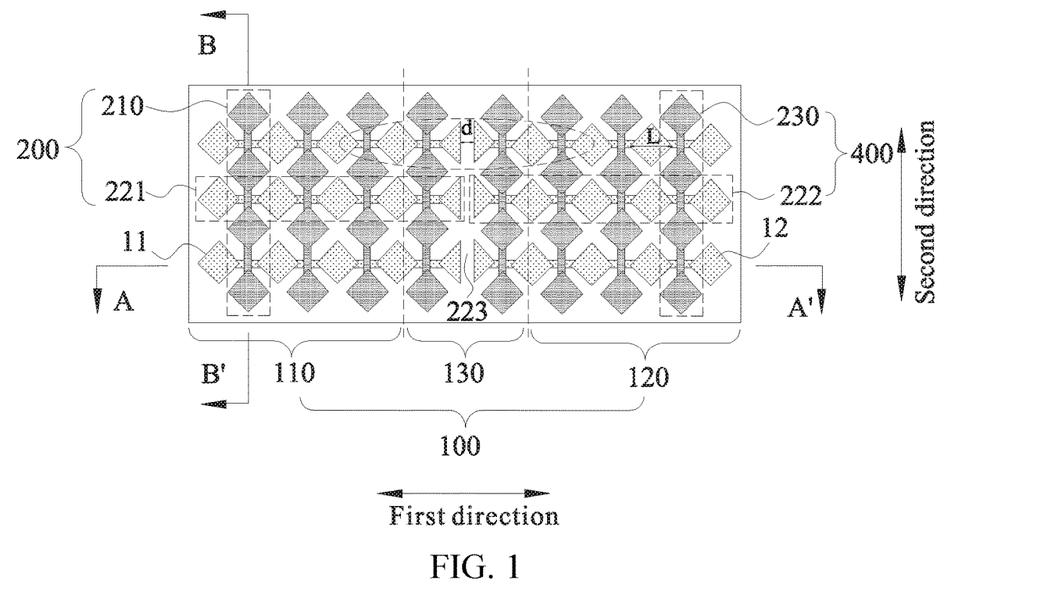
FIG. 1 shows a schematic diagram of a structure of a touch substrate according to an embodiment of the present application.

In the present application, during split-screen display of the display apparatus, a user's touch finger may touch the first non-bent region 110 of the touch substrate for touch display, other fingers are placed on the second non-bent region 120 of the touch substrate. Since a portion of a first receiving electrode group 221 extending into the bent region 130 is not connected with a portion of a second receiving electrode group 222 extending into the bent region 130, touch on the second non-bent region by other fingers will not cause interference with touch display in the first non-bent region, so that a reported point position is consistent with a touch position, thereby effectively alleviating a problem of false touch.

Moreover, since the portion of the first receiving electrode group 221 extending into the bent region 130 is not connected with the portion of the second receiving electrode group 222 extending into the bent region 130, both a second emission electrode group and a second receiving electrode group in the second non-bent region may be placed in an OFF state during split-screen display of the display apparatus, thereby alleviating the problem of poor grounding of the whole machine. Or, a second emission electrode group in the second non-bent region may be placed in an OFF state, a second receiving electrode group in the second non-bent region is placed in an ON state, and a grounding signal is applied to a receiving electrode group in the second non-bent region through a drive circuit, so that only one grounding signal is provided in the display apparatus, and the problem of poor grounding of the whole machine may be further alleviated.

Various structures of the touch substrate will be described in detail below according to specific embodiments of the present application.

According to an embodiment of the present application, referring to FIG. 1, multiple first emission electrodes in a same first emission electrode group 210 extend along a second direction and multiple first emission electrode groups 210 are sequentially arranged in a first direction. Multiple first receiving electrodes 11 in a same first receiving electrode group 221 extend along the first direction and multiple first receiving electrode groups 221 are sequentially arranged in the second direction. Similarly, a second emission electrode group and a second receiving electrode group in a second touch structure 400 are also arranged in a same arrangement manner. A first receiving electrode 11 and a second receiving electrode 12 may be in a same layer and made of a same material. Similarly, a first emission electrode group may include multiple first emission electrodes, a second emission electrode group may include multiple second emission electrodes, and a first emission electrode and a second emission electrode may also be in a same layer and made of a same material. Therefore, a touch electrode structure composed of an emission electrode group and a receiving electrode group has good use performance, and is convenient for manufacturing the emission electrode group and the receiving electrode group. Those skilled in the art can understand that an electrode belonging to a first touch electrode structure and an electrode belonging to a second touch electrode structure disposed in a same layer are insulated from each other.

According to some embodiments of the present application, an orthographic projection of a first receiving electrode located in a bent region on a base substrate and an orthographic projection of a second receiving electrode located in the bent region on the base substrate are spaced. Specifically, a first receiving electrode in a bent region may be connected with a first receiving electrode in a first receiving electrode group located in the first non-bent region 110, i.e. the first receiving electrode in the first receiving electrode group in the first non-bent region 110 may extend into the bent region. Similarly, a second receiving electrode in the bent region may be connected with a second receiving electrode in a second receiving electrode group located in the second non-bent region 130, i.e. the second receiving electrode in the second receiving electrode group in the second non-bent region 130 may also extend into the bent region. However, the first receiving electrode and the second receiving electrode in the bent region are not connected, and there is a gap between orthographic projections of the two on the base substrate.

Specifically, referring to FIG. 1, a first receiving electrode group 221 and a second receiving electrode group 222 may be collinearly disposed. A first receiving electrode and a second receiving electrode in the bent region are also collinearly disposed, and there is a gap 223 between the first receiving electrode and the second receiving electrode that are collinearly disposed. Therefore, problems of false touch and poor grounding of a whole machine may be alleviated.

It should be noted that "collinearly disposed" may mean that a central axis of an electrode group or electrode in a first direction is on a same straight line as a central axis of another electrode group or electrode in the first direction. In other words, the multiple first receiving electrodes and the multiple second receiving electrodes in the bent region may all be arranged along the first direction, for example, a first receiving electrode and a second receiving electrode adjacent thereto may be arranged in a row along the first direction. And there is a gap between a first receiving electrode and a second receiving electrode that are adjacent.

Figure 2:
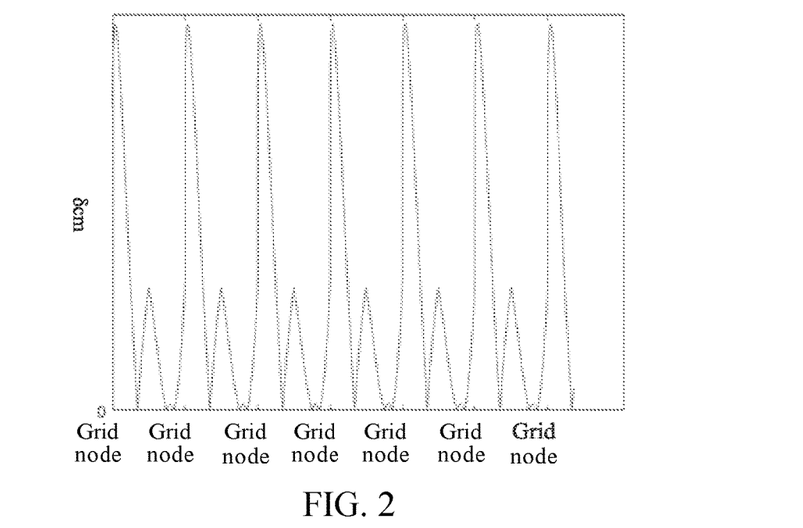
FIG. 2 shows a linearity curve of a touch display apparatus.
Figure 4:
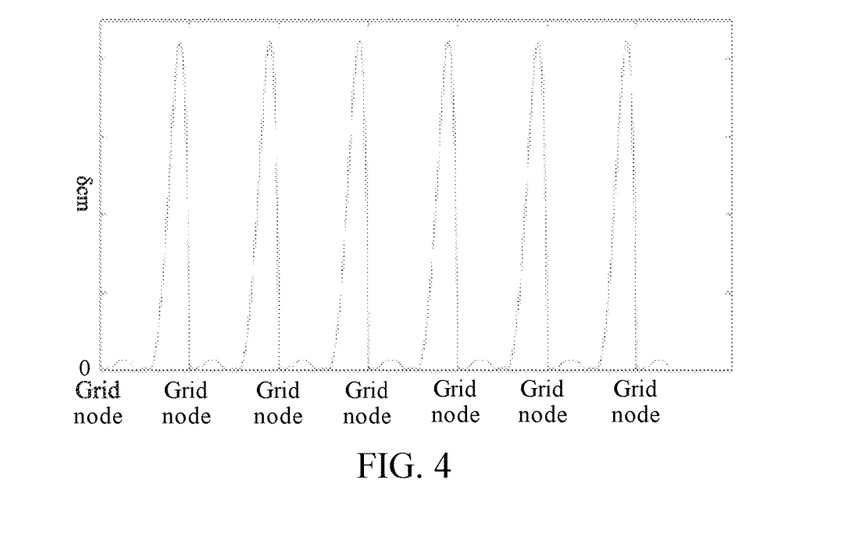
FIG. 4 shows a linearity curve of a touch display apparatus.

According to an embodiment of the present application, referring to FIG. 1, a first receiving electrode and a second receiving electrode may both be diamond-shaped electrode blocks and areas of the first receiving electrode and the second receiving electrode may be consistent. A length d of a gap 223 is less than ½ of a diagonal length L of a first receiving electrode 11 or a second receiving electrode 12. Specifically, when two diagonal lengths of a diamond-shaped electrode block are not equal, a length d of a gap 223 may be less than ½ of a diagonal length L of a first receiving electrode 11 or a second receiving electrode 12 in the first direction. The inventor found that if a length of a gap is greater than or equal to ½ of a diagonal length of a receiving electrode, linearity of a display apparatus becomes worse when the display apparatus is flattened for display (i.e., the display apparatus is in an unfolded state). Specifically, when marking on the display apparatus from a first non-bent region through a bent region to a second non-bent region, due to an overlarge gap, there will be some uniformly increased noises, and linearity will become worse (referring to FIG. 2), which shows that the marking line is discontinuous on display. By setting a length of a gap within the above range in the present application, not only problems of false touch and poor grounding of a whole machine during split-screen display of the display apparatus may be alleviated, but also it may be ensured that the display apparatus has good linearity (similar to a linearity curve shown in FIG. 4) when the display apparatus is flattened for display. A specific length of a gap is not particularly limited, as long as it may play a role of alleviating false touch and poor grounding of a whole machine, and make a display apparatus have good linearity when the display apparatus is flattened for display, and those skilled in the art may design according to a specific situation.

Those skilled in the art can understand that both an emission electrode and a receiving electrode in a touch electrode structure are in an ON state when a display apparatus is flattened for display.

According to an embodiment of the present application, referring to FIG. 1, multiple emission electrodes in a first emission electrode group 210 and a second emission electrode group 230 may all be arranged along the second direction, and symmetry axes of multiple emission electrodes located in a same emission electrode group in the second direction may be located on a same straight line. Therefore, a touch electrode structure may have good use performance. According to an embodiment of the present application, a size of an emission electrode may be consistent with a size of a receiving electrode. That is, a size of a first emission electrode may be consistent with a first receiving electrode, and a size of a second emission electrode may be consistent with a size of a second receiving electrode 12.

Figure 3:
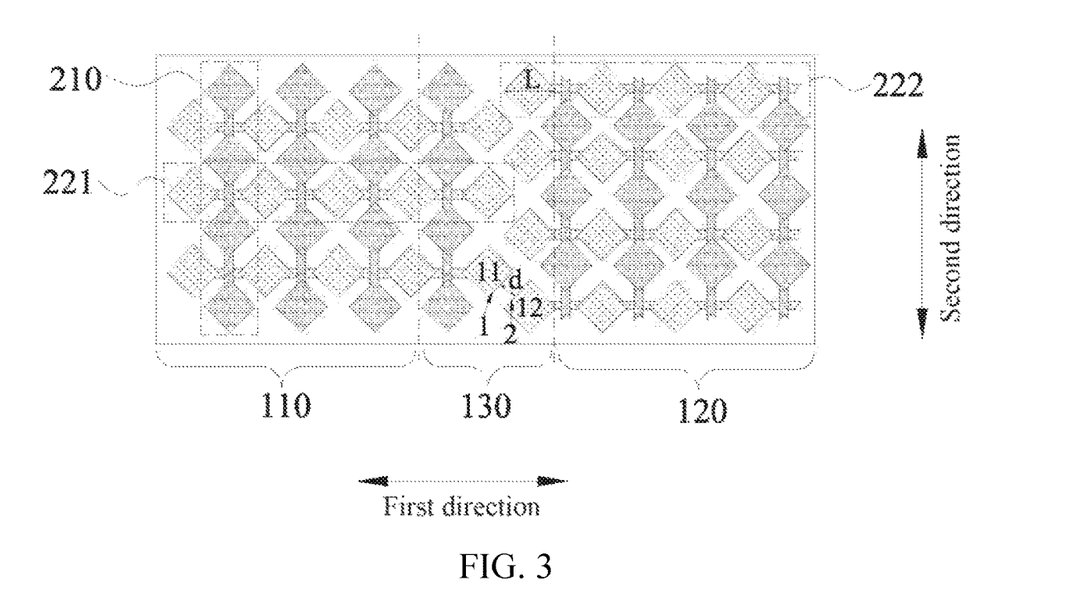
FIG. 3 shows a schematic diagram of a structure of a touch substrate according to another embodiment of the present application.

According to other embodiments of the present application, referring to FIG. 3, first receiving electrode groups 221 and second receiving electrode groups 222 may be alternately arranged in turn in a second direction. At this time, a first receiving electrode 11 and a second receiving electrode 12 may both be diamond-shaped electrode blocks. A bent region has multiple first receiving electrodes 11 and multiple second receiving electrodes 12, and the multiple first receiving electrodes 11 and the multiple second receiving electrodes 12 are disposed crosswise in the second direction, i.e. the first receiving electrodes 11 and the multiple second receiving electrodes 12 are not collinearly disposed at this time. That is to say, a bent region may have multiple first receiving electrodes and multiple second receiving electrodes, and two second receiving electrodes and a first receiving electrode located between the two second receiving electrodes may be arranged in a triangle. Referring specifically to FIG. 3, a first receiving electrode 11 having a first side 1 and a second receiving electrode 12 having a second side 2, and another second receiving electrode located above the second receiving electrode 12 may be arranged in a triangle, and the first receiving electrode 11 may be located on a midline of a perpendicular connection line between two adjacent corners of the two second receiving electrodes along a symmetry axis of a first direction. Therefore, a portion of a first receiving electrode group extending into a bent region may not be connected with a portion of a second receiving electrode group extending into the bent region, so as to alleviate problems of false touch and poor grounding of a whole machine, so that receiving electrode groups have good use performance.

The inventor found that, first receiving electrode groups and second receiving electrode groups are arranged alternately in turn in a second direction, and a central axis of a second diamond-shaped electrode block in the second direction is located on a side of a central axis of a first diamond-shaped electrode block in the second direction away from a first non-bent region, that is, the first receiving electrode groups and the second receiving electrode groups are arranged in a staggered way, which is more beneficial to make a display apparatus have good linearity when the display apparatus is flattened for display, compared with a case that the first receiving electrode groups and the second receiving electrode groups are collinearly disposed.

According to an embodiment of the present application, referring to FIG. 3, a first receiving electrode 11 has a first side 1, a second receiving electrode 12 has a second side 2, the first side 1 and the second side 2 are parallel and adjacent, and a distance d between the first side 1 and the second side 2 is less than $\sqrt{2}/2$ times a diagonal length of a receiving electrode 10. The inventor found that if a distance between a first side and a second side is greater than or equal to $\sqrt{2}/2$ times a diagonal length of a receiving electrode, when a display apparatus is flattened for display, linearity of the display apparatus will deteriorate. By setting a space between a first side and a second side within the above range in the present application, not only problems of false touch and poor grounding of a whole machine during split-screen display of a display apparatus may be alleviated, but also it may be ensured that the display apparatus has good linearity (referring to FIG. 4) when the display apparatus is flattened for display. A specific length of a space between a first side and a second side is not particularly limited, as long as it may play a role of alleviating false touch and poor grounding of a whole machine, and make a display apparatus have good linearity when the display apparatus is flattened for display, and those skilled in the art may design according to a specific situation.

According to an embodiment of the present application, referring to FIG. 3, in order to simplify manufacture of a touch electrode group, when electrodes in a touch electrode structure are all diamond-shaped electrode blocks and first receiving electrodes 11 and second receiving electrodes 12 are arranged in a staggered way, a receiving electrode group, and multiple emission electrodes located in another non-bent region may be collinearly disposed. Specifically, since multiple first receiving electrodes in a first receiving electrode group are all arranged along a first direction and multiple second receiving electrodes in a second receiving electrode group are also arranged along the first direction, when first receiving electrodes 11 and second receiving electrodes 12 are arranged in a staggered way, first receiving electrode groups 221 located in a first non-bent region 110 and second receiving electrode groups 222 located in a second non-bent region 120 are also arranged in a staggered way. While an emission electrode group extends along a second direction, first emission electrodes arranged uppermost among multiple first emission electrode groups in the first non-bent region 110 may be arranged in a straight line along the first direction. At this time, if an uppermost second receiving electrode group 222 in the second non-bent region 120 is collinear with the multiple first emission electrodes, an overall occupied area of a touch electrode group may be saved, and a distance between an emission electrode and a receiving electrode may be reduced. Therefore, the touch electrode structure may have good use performance.

According to an embodiment of the present application, specific positions and connection manners of multiple electrodes in electrode groups of a first touch electrode structure and a second touch electrode structure are not particularly limited, for example, multiple electrodes in a same electrode group may be in a same layer and made of a same material, and connected through connection wires. Or, multiple electrodes located in a same electrode group may be communicated by means of, including but not limited to, via jumpers. For example, taking a first touch electrode structure as an example, electrodes in a first emission electrode group and a first receiving electrode group (such as diamond-shaped electrode blocks shown in FIG. 1) may be in a same layer and made of a same material. In order to avoid short circuit of connection lines for connecting electrodes of the first emission electrode group and the first receiving electrode group at projection intersections, an insulation block may be provided in a region where a projection of a connection line of the first emission electrode group on a base substrate is overlapped with a projection of a connection line of the first receiving electrode group on the base substrate for lapping.

Figure 7:
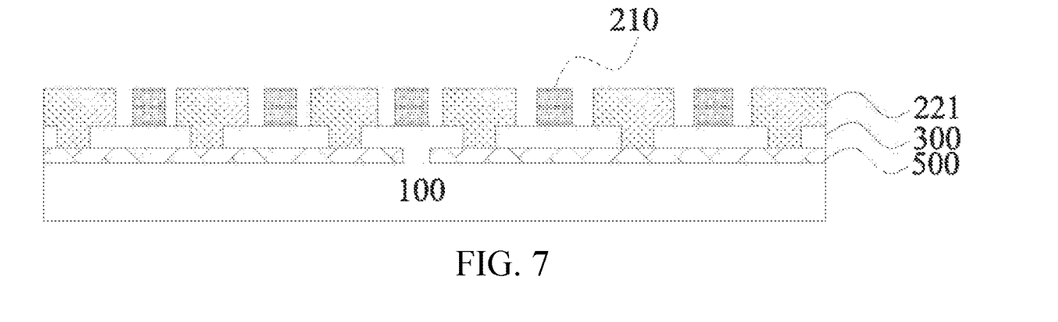
FIG. 7 shows a schematic diagram of a cross-sectional structure along an A-A' direction in FIG. 1.
Figure 8:
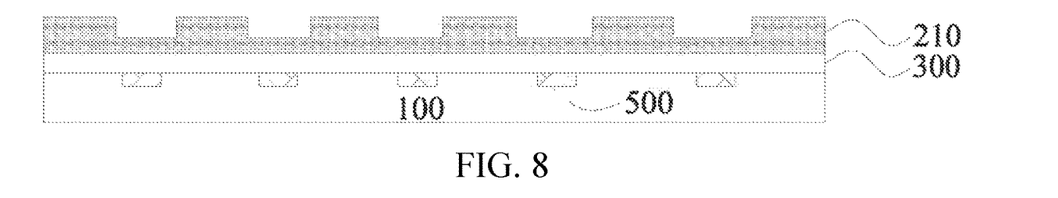
FIG. 8 shows a schematic diagram of a cross-sectional structure along a B-B' direction in FIG. 1.
Figure 9:
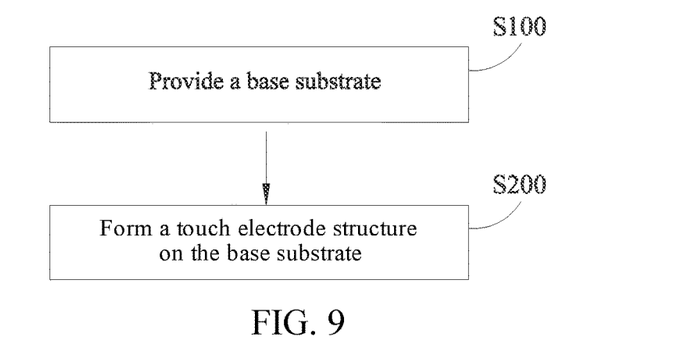
FIG. 9 shows a schematic flowchart of a method for manufacturing a touch substrate according to an embodiment of the present application.

According to other embodiments of the present application, referring to FIGS. 7 and 8, a conductive connection layer 500 may be provided between a touch electrode structure (such as first receiving electrode groups 221 shown in the figure) and a base substrate 100, an insulation layer 300 is provided between the conductive connection layer 500 and the touch electrode structure, an emission electrode group and a receiving electrode group are disposed in a same layer. Taking first emission electrode groups and first receiving electrode groups as an example, multiple emission electrodes in each of first emission electrode groups 210 may be directly connected, multiple receiving electrodes in each of first receiving electrode groups 221 may be connected with the conductive connection layer 500 through a via penetrating through the insulation layer 300 to achieve connections between multiple receiving electrodes, the conductive connection layer 500 may be disconnected at a gap 223 as shown in FIG. 1, and the first emission electrode groups 210 may be disposed in a same layer as the first receiving electrode groups 221. Thereby, short circuit between a connection line in a first emission electrode group and a connection line of a first receiving electrode group may be avoided. Referring to FIG. 8, an electrode block and a connection line in a first emission electrode group 210 may be disposed in a same layer, and connection lines connecting multiple first receiving electrodes in a first receiving electrode group may be formed in the conductive connection layer 500 through a patterning process. Or, multiple receiving electrodes in each receiving electrode group may be directly connected with each other, and multiple emission electrodes in each emission electrode group may be connected with a conductive connection layer through a via penetrating through an insulation layer, so as to achieve connections between multiple emission electrodes (this case is not shown in the figure).

In another aspect of the present application, the present application provides a method for manufacturing a touch substrate. According to an embodiment of the present application, the touch substrate manufactured by the method may be the touch substrate described above, therefore the touch substrate manufactured with the method may have same features and advantages as those of the touch substrate described above, which will not be repeated here.

According to an embodiment of the present application, referring to FIG. 8, the method includes following acts.

In S100, a base substrate is provided.

In this act, the base substrate is provided. According to an embodiment of the present application, the base substrate has a bent region, and a first non-bent region and a second non-bent region adjacent to the bent region. A specific material of the base substrate is not particularly limited, and those skilled in the art may design according to a common material of a base substrate in a touch substrate.

In S200, a touch electrode structure is formed on the base substrate.

In this act, the touch electrode structure is formed on the base substrate. According to an embodiment of the present application, the touch electrode structure includes a first touch electrode structure located in the first non-bent region and a second touch electrode structure located in the second non-bent region, the first touch electrode structure includes multiple first emission electrode groups and multiple first receiving electrode groups, the second touch electrode structure includes multiple second emission electrode groups and multiple second receiving electrode groups, the first emission electrode groups and the second emission electrode groups all extend along a first direction, the first receiving electrode groups and the second receiving electrode groups all extend along a second direction, the first direction intersects with the second direction, a first receiving electrode group includes multiple first receiving electrodes arranged along the first direction, a second receiving electrode group includes multiple second receiving electrodes arranged along the first direction, and the bent region includes at least a first receiving electrode and a second receiving electrode. Therefore, problems of false touch of a display apparatus and poor grounding of a whole machine may be effectively alleviated, a touch display effect may be improved, and user experience may be improved.

According to an embodiment of the present application, multiple emission electrode groups in a touch electrode structure extend along a second direction and are sequentially arranged in a first direction. An emission electrode group and a receiving electrode group may be formed through following acts. First, a conductive material layer is formed on a base substrate. Subsequently, based on a predetermined mask, the conductive material layer is patterned to form an emission electrode group and a receiving electrode group. Thereby, the emission electrode group and the receiving electrode group may be formed synchronously. Since the emission electrode group and the receiving electrode group are synchronously formed by a predetermined mask through a patterning process, an opening shape of the mask is designed according to shapes and a position relationship of the emission electrode group and the receiving electrode group.

According to some embodiments of the present application, in a process of forming an emission electrode group and a receiving electrode group, an opening of a mask may be adjusted, so that a first receiving electrode group and a second receiving electrode group are collinearly disposed, and there is a gap between a portion of the first receiving electrode group extending into a bent region and a portion of the second receiving electrode group extending into the bent region, that is, a first receiving electrode and a second receiving electrode located in the bent region are spaced apart. Therefore, a portion of a first receiving electrode group extending into a bent region may be caused to be not connected with a portion of a second receiving electrode group extending into the bent region, so as to alleviate problems of false touch and poor grounding of a whole machine.

A shape of a receiving electrode in a receiving electrode group, a shape of an emission electrode in an emission electrode group, a position relationship between the emission electrode and the receiving electrode, and a length of a gap have been described in detail above and will not be repeated here.

According to other embodiments of the present application, when a bent region has multiple first receiving electrodes and multiple second receiving electrodes and the multiple first receiving electrodes and the multiple second receiving electrodes are disposed crosswise in a second direction, an opening of a mask may be adjusted in a process of forming an emission electrode group and a receiving electrode group, so that first receiving electrode groups and second receiving electrode groups are alternately arranged in turn in the second direction to form a touch electrode structure as shown in FIG. 3. Therefore, a portion of a first receiving electrode group extending into a bent region may be caused to be not connected with a portion of a second receiving electrode group extending into the bent region, so as to alleviate a problem of false touch and a problem of poor grounding of a whole machine, so that receiving electrode groups have good use performance.

A position relationship between an emission electrode and a receiving electrode and a distance between a first receiving electrode and a second receiving electrode have been described in detail above and will not be repeated here.

According to an embodiment of the present application, in this act, before forming the touch electrode structure, a conductive connection layer may also be formed on the base substrate in advance, then an insulation layer is formed on a side of the conductive connection layer away from the base substrate, and a via penetrating through the insulation layer is formed in a predetermined region of the insulation layer, finally, the touch electrode structure is formed on a side of the insulation layer away from the conductive connection layer, so that multiple emission electrodes in each emission electrode group may be directly connected with each other, and multiple receiving electrodes in each receiving electrode group may be connected with the conductive connection layer through the via, thus achieve connections between multiple receiving electrodes. Or, multiple receiving electrodes in each receiving electrode group may be directly connected with each other, and multiple emission electrodes in each emission electrode group may be connected with the conductive connection layer through the via, so as to achieve connections between multiple emission electrodes.

In another aspect of the present application, the present application provides a touch display apparatus. According to an embodiment of the present application, the touch display apparatus includes the touch substrate described above. Therefore, the touch display apparatus has all features and advantages of the touch substrate described above, and will not be repeated here. Generally speaking, the touch display apparatus has good touch display effect, which may significantly improve user experience.

Figure 10:
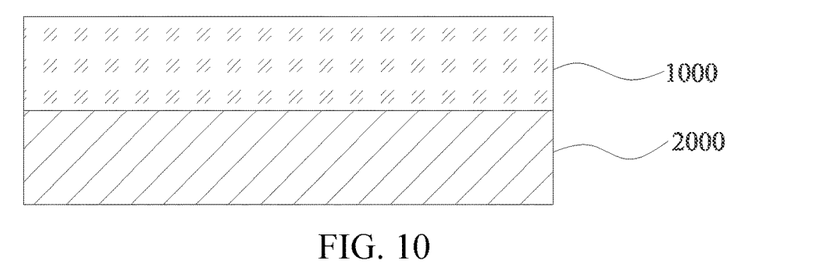
FIG. 10 shows a schematic diagram of a structure of a touch display apparatus according to an embodiment of the present application.

According to an embodiment of the present application, referring to FIG. 10, the touch display apparatus includes a display panel 2000 and a touch substrate 1000. The touch substrate 1000 is disposed on a light emitting side of the display panel 2000. Therefore, the touch display apparatus has good touch display effect, which may improve use experience of a user.

Figure 11:
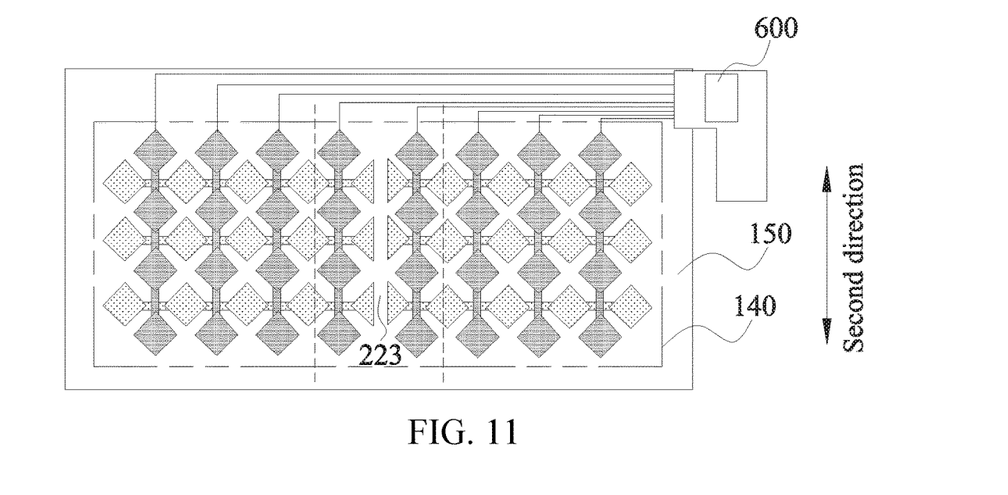
FIG. 11 shows a schematic diagram of a structure of a touch display apparatus according to another embodiment of the present application.
Figure 12:
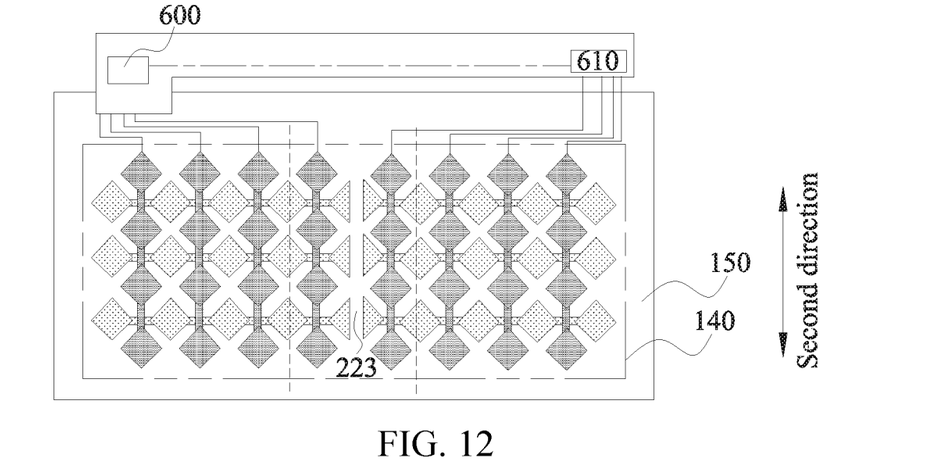
FIG. 12 shows a schematic diagram of a structure of a touch display apparatus according to yet another embodiment of the present application.

Referring to FIGS. 11 and 12, the touch display apparatus may also include a touch chip. For example, referring to FIG. 11, a first receiving electrode in a first touch electrode structure located in a first non-bent region and a second receiving electrode located in a second non-bent region may be connected to a same touch chip 600, for example, a touch electrode structure located in a display region 140 may be connected to a touch chip 600 at a peripheral routing region 150 through a connection line. Thus, a touch structure in the touch display apparatus may be uniformly controlled through a touch chip 600. Or, when the peripheral routing region 150 of the touch display apparatus is insufficient to support channels of multiple touch electrodes, referring to FIG. 12, the touch display apparatus may include a main touch chip (such as a touch chip 600 shown in the figure) and a secondary touch chip 610, the main touch chip is electrically connected with the secondary touch chip 610, a first emission electrode group and a second emission electrode group (a connection relationship is not shown in the figure), and a first receiving electrode group may all be electrically connected with the main touch chip 600, and a second receiving electrode group may be electrically connected with the secondary touch chip.

In another aspect of the present application, the present application provides a method for controlling the touch display apparatus described above. According to an embodiment of the present application, during split-screen display of the touch display apparatus, both a second emission electrode group and a second receiving electrode group in a second non-bent region may be placed in an OFF state. Therefore, a problem of poor grounding of the whole display apparatus may be alleviated. Or, according to other embodiments of the present application, during split-screen display of the touch display apparatus, a second emission electrode group in a second non-bent region is placed in an OFF state, a second receiving electrode group is placed in an ON state, and a grounding signal is applied to the second receiving electrode group. Therefore, the problem of poor grounding of the whole display apparatus may be further alleviated, a touch display effect may be further improved, and user experience may be improved.

Specifically, a first receiving electrode and a second receiving electrode in a first touch electrode structure located in a first non-bent region are connected to a same touch chip. That is to say, in this method, receiving electrode groups of two non-bent regions on both sides of a bent region are disconnected, and a receiving electrode group in each non-bent region separately enters a control system for control, signal acquisition, and reporting a point position. Therefore, in a case that the touch display apparatus is flattened, left and right screens may be prevented from reporting points at the same time, and mutual influences of touch signals between two non-bent regions may be alleviated. Connecting a first receiving electrode and a second receiving electrode to a same touch chip may better uniformly process touch signals on both sides, and signals reported from both sides reach a single reporting point through a calibration processing, and the left and right screens (i.e., two non-bent regions) are marked continuously. In a case that the touch display apparatus is folded, the touch chip may be used for closing a secondary screen (i.e., one of the two non-bent regions), and a touch electrode in this region do not receive a signal and a grounding or floating processing is performed, and false alarm points of an edge may be reduced through an edge weakening processing of the touch chip.

Or, when a peripheral routing region of the touch display apparatus is insufficient to support channels of multiple touch electrodes, a first receiving electrode and a second receiving electrode may also be caused to be respectively connected to an auxiliary touch chip and a main touch chip. The auxiliary touch chip and the main touch chip are controlled integrally. Therefore, a touch effect by using this method may be further improved.

In the description of the present application, an orientation or a position relationship indicated by terms "up", "down", etc. is based on an orientation or a position relationship shown in the drawings, and is only for convenience of describing the present application without requiring the present application to be constructed and operated in a specific direction, and therefore cannot be understood as a limitation on the present application.

In the description of this specification, description referring to terms "one embodiment", "another embodiment", etc. means that specific features, structures, materials, or characteristics described in connection with this embodiment are contained in at least one embodiment of the present application. In this specification, the schematic expression of the above terms does not necessarily refer to the same embodiment or example. Moreover, the specific feature, structure, material, or characteristic described may be combined in a proper way in any one or more embodiments or examples. In addition, without a conflict, a person skilled in the art may combine different embodiments or examples described in this specification and the features of different embodiments or examples. In addition, it should be noted that in the specification, terms "first" and "second" are used for the purpose of description only, but cannot be interpreted as indicating or implying relative importance or implicitly indicating a quantity of technical features indicated.

Although the embodiments of the present application have been shown and described above, it should be understood that the above embodiments are exemplary, but will not be understood as the limitation to the present application. Alterations, modifications, substitutions and variations to the above embodiments may be made by those skilled in the art within the scope of the present application.

The invention claimed is:

1. A touch substrate, comprising:
a base substrate and a touch electrode structure located on the base substrate, wherein:
the touch substrate comprises a bent region, and a first non-bent region and a second non-bent region adjacent to the bent region, and the first non-bent region and the second non-bent region are configured to be bent around the bent region;
the touch electrode structure comprises a first touch electrode structure located in the first non-bent region and a second touch electrode structure located in the second non-bent region, the first touch electrode structure comprises a plurality of first emission electrode groups and a plurality of first receiving electrode groups, the second touch electrode structure comprises a plurality of second emission electrode groups and a plurality of second receiving electrode groups, the first emission electrode groups and the second emission electrode groups all extend along a first direction, the first receiving electrode groups and the second receiving electrode groups all extend along a second direction, the first direction intersects with the second direction, a first receiving electrode group comprises a plurality of first receiving electrodes arranged along the first direction, a second receiving electrode group comprises a plurality of second receiving electrodes arranged along the first direction, and the bent region comprises at least a first receiving electrode and a second receiving electrode;
an orthographic projection of the first receiving electrode located in the bent region on the base substrate and an orthographic projection of the second receiving electrode located in the bent region on the base substrate are arranged at intervals; and
the bent region has a plurality of first receiving electrodes and a plurality of second receiving electrodes, the plurality of first receiving electrodes and the plurality of second receiving electrodes are all arranged along the second direction, and two second receiving electrodes and a first receiving electrode located between the two second receiving electrodes are arranged in a triangle.

2. The touch substrate according to claim 1, wherein the first receiving electrodes and the second receiving electrodes are in a same layer and made of a same material, a first emission electrode group comprises a plurality of first emission electrodes, a second emission electrode group comprises a plurality of second emission electrodes, and the first emission electrodes and the second emission electrodes are in a same layer and made of a same material.

3. The touch substrate according to claim 1, wherein the first receiving electrodes and the second receiving electrodes located in the bent region are all diamond-shaped electrode blocks, the first receiving electrode has a first side, the second receiving electrode has a second side, the first side and the second side are parallel and adjacent, and a distance between the first side and the second side that are adjacent is less than $\sqrt{2}/2$ times a diagonal length of a diamond-shaped electrode block along the first direction.

4. The touch substrate according to claim 1, wherein the bent region has a plurality of first receiving electrodes and a plurality of second receiving electrodes, the plurality of first receiving electrodes and the plurality of second receiving electrodes are all arranged along the first direction, and there is a gap between a first receiving electrode and a second receiving electrode that are adjacent.

5. The touch substrate according to claim 4, wherein the first receiving electrodes and the second receiving electrodes located in the bent region are all triangular electrode blocks, first receiving electrodes and second receiving electrodes in a non-bent region are all diamond-shaped electrode blocks, and a length of the gap between the first receiving electrode and the second receiving electrode located in the bent region is less than ½ of a diagonal length of a diamond-shaped electrode block located in the non-bent region along the first direction.

6. A touch display apparatus, comprising a display panel and the touch substrate according to claim 1, wherein the touch substrate is located on a light emitting side of the display panel.

7. The touch display apparatus according to claim 6, further comprising a touch chip, wherein a first receiving electrode and a second receiving electrode in a first touch electrode structure located in a first non-bent region are connected to a same touch chip, or, further comprising a main touch chip and a secondary touch chip, wherein the main touch chip is electrically connected with the secondary touch chip, a first emission electrode group, a second emission electrode group, and a first receiving electrode group are electrically connected with the main touch chip, and a second receiving electrode group is electrically connected with the secondary touch chip.

8. A method for controlling the touch display apparatus according to claim 6, comprising:
making touch electrode structures located in a first non-bent region and a second non-bent region be in an ON state during split-screen display of the touch display apparatus; and
making a second touch electrode structure located in the second non-bent region be in an OFF state during split-screen display of the touch display apparatus,
or, during split-screen display of the touch display apparatus, making a second emission electrode group in the second touch electrode structure in the second non-bent region be in an OFF state, making a second receiving electrode group be in an ON state, and applying a grounding signal to the second receiving electrode group.

9. A touch display apparatus, comprising a display panel and the touch substrate according to claim 2, wherein the touch substrate is located on a light emitting side of the display panel.

10. A touch display apparatus, comprising a display panel and the touch substrate according to claim 3, wherein the touch substrate is located on a light emitting side of the display panel.

11. A touch display apparatus, comprising a display panel and the touch substrate according to claim 4, wherein the touch substrate is located on a light emitting side of the display panel.

12. A touch display apparatus, comprising a display panel and the touch substrate according to claim 5, wherein the touch substrate is located on a light emitting side of the display panel.

13. A method for controlling the touch display apparatus according to claim 7, comprising:
making touch electrode structures located in a first non-bent region and a second non-bent region be in an ON state during split-screen display of the touch display apparatus;
making a second touch electrode structure located in the second non-bent region be in an OFF state during split-screen display of the touch display apparatus,
or, during split-screen display of the touch display apparatus, making a second emission electrode group in the second touch electrode structure in the second non-bent region be in an OFF state, making a second receiving electrode group be in an ON state, and applying a grounding signal to the second receiving electrode group.

14. A method for manufacturing a touch substrate, comprising:
providing a base substrate, wherein the base substrate has a bent region, and a first non-bent region and a second non-bent region adjacent to the bent region, the first non-bent region and the second non-bent region are configured to be bent around the bent region; and
forming a touch electrode structure on the substrate, comprising a first touch electrode structure located in the first non-bent region and a second touch electrode structure located in the second non-bent region, wherein the first touch electrode structure comprises a plurality of first emission electrode groups and a plurality of first receiving electrode groups, the second touch electrode structure comprises a plurality of second emission electrode groups and a plurality of second receiving electrode groups, the first emission electrode groups and the second emission electrode groups all extend along a first direction, the first receiving electrode groups and the second receiving electrode groups all extend along a second direction, the first direction intersects with the second direction, a first receiving electrode group comprises a plurality of first receiving electrodes arranged along the first direction, a second receiving electrode group comprises a plurality of second receiving electrodes arranged along the first direction, and the bent region comprises at least a first receiving electrode and a second receiving electrode,
wherein: an orthographic projection of the first receiving electrode located in the bent region on the base substrate and an orthographic projection of the second receiving electrode located in the bent region on the base substrate are arranged at intervals; and the bent region has a plurality of first receiving electrodes and a plurality of second receiving electrodes, the plurality of first receiving electrodes and the plurality of second receiving electrodes are all arranged along the second direction, and two second receiving electrodes and a first receiving electrode located between the two second receiving electrodes are arranged in a triangle.

15. The method according to claim 14, wherein the touch electrode structure is formed through following acts:

forming a conductive material layer on the base substrate;
patterning the conductive material layer based on a predetermined mask to form the touch electrode structure.

* * * * *